July 25, 1961     B. L. GOSS ET AL     2,994,005
COMMUTATOR RISER CONSTRUCTION
Filed June 13, 1958
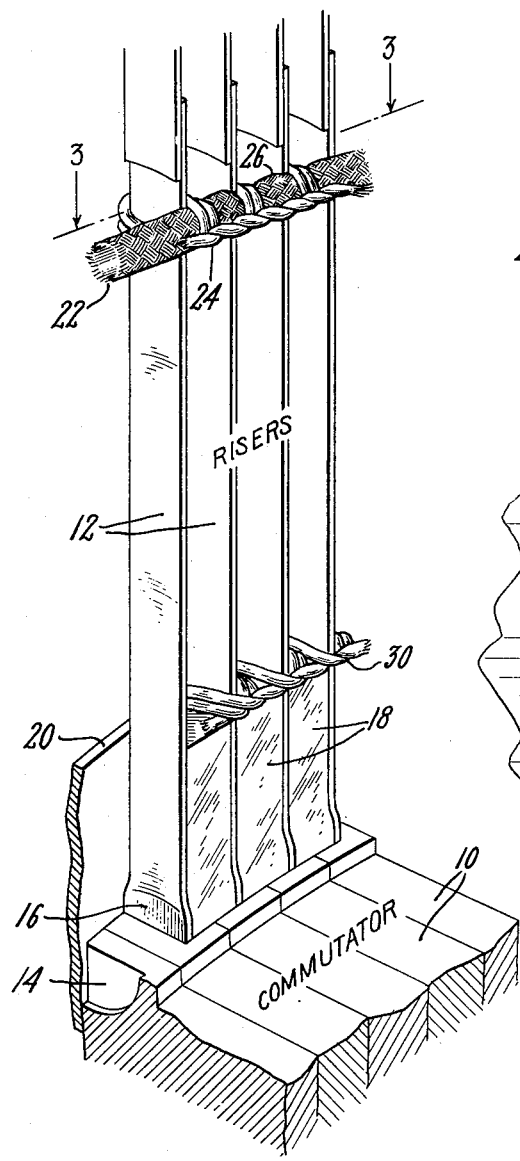
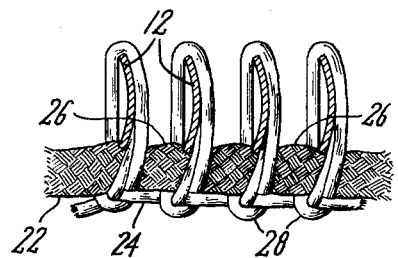
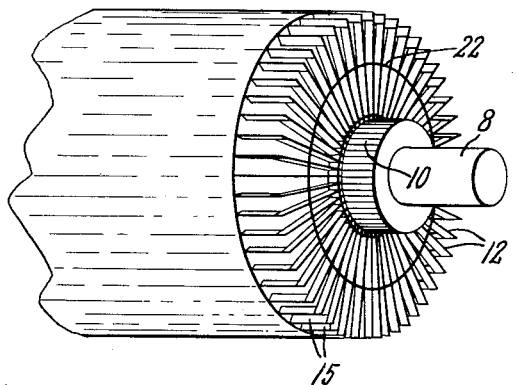
Inventors
Barnard L. Goss
Robert W. Stevens
by James R. Campbell
Their Attorney

United States Patent Office 2,994,005
Patented July 25, 1961

2,994,005
COMMUTATOR RISER CONSTRUCTION
Barnard L. Goss, Scotia, and Robert W. Stevens, Schenectady, N.Y., assignors to General Electric Company, a corporation of New York
Filed June 13, 1958, Ser. No. 741,846
9 Claims. (Cl. 310—234)

The invention described herein relates to dynamoelectric machines and more particularly to an improved commutator riser construction utilized for carrying current between the commutator segments and armature coils mounted on the rotating armature or rotor of the machine.

The commutator risers of the prior art generally comprise a plurality of flat copper strips each brazed at one end to a commutator segment and at its other end to a coil mounted on the rotating core. The lengths of these strips vary with the size of the machine and distances of three to four feet between the segments and coil connections are not uncommon in machines of current design. During operation, the strips or risers are subjected to vibratory forces, as well as magnetic and centrifugal forces, thus requiring the use of insulating spacers between risers at selected points along the riser length. The risers therefore present a structure having the effect of an integrally formed mass of web-like configuration for providing individual paths for current flow to the coils and for resisting the various types of forces to which it is subjected. The predominant vibratory forces encountered by risers take the form of inpact stresses developed when loads are applied instantaneously to the machine. The resultant shock to the rotating parts excites the riser construction to a degree sufficient to establish vibrations occurring a the natural frequencies of the individual risers and the rotor system.

The impact stresses and natural frequency vibrations create many adverse effects, the principal one being fracture of the risers at their points of connection to the commutator segments. As the rotor or armature rotates and is subjected to such stresses, the riser construction bends as a unit until fracture of the weakest risers occurs. The bending stresses develop along the riser length and reach their maximum values at the point of attachment of the risers to the commutator segments. The disadvantage resulting from breakage at this point is that the coil connected with the affected riser is removed from the electrical circuit of the machine, thus creating an electrical imbalance in the electrical operating components. Such a broken riser represents a loose mechanical part, which when subjected to the centrifugal forces generated by the machine, contacts adjacent risers to create short circuits therebetween and cause burn-out of additional risers. The distinct possibility exists that a broken riser at two points may fall into the rotating parts of the machine, thereby increasing the likelihood of extensive damage over and above that which otherwise would be caused by electrical failure.

Another factor contributing to the fracture of these parts is that during the operation of brazing one end of the risers to the commutator segments, the metal in the riser adjacent the commutator segment becomes annealed, thereby resulting in weakening of the riser metal at its point of connection where the strength is needed most.

An equally important problem presented by the prior art constructions is that insulated spacers or buttons inserted between all adjacent risers are subjected to the same impact stresses and vibratory forces which cause undue loosening and wear. Looseness permits more pronounced vibration of individual risers thus accelerating the time when fracture takes place. Another disadvantage of spacers is that each button must be separately machined to the desired tolerance in order to prevent build-up of material between the risers during manufacture.

A primary object of our invention therefore is to provide a commutator riser construction capable of minimizing the fracture of risers at their point of attachment to commutator segments on a machine.

Another object of our invention is to modify the present risers to provide an increase in resistance to stresses without increasing the mass of the riser.

Still another object of our invention is to provide a more effective arrangement for spacing and positioning commutator risers while simultaneously decreasing the manufacturing costs.

In carrying out our invention, we fill the space between risers at their point of connection to commutator segments with a material having a modulus of elasticity less than the risers for absorbing stresses therein during machine operation. The material further permits a gradual transition from great stress to low stress in the riser construction. It serves to move the stress point outward on the riser away from the annealed area which has been weakened during the brazing process, thus minimizing the possibility of riser fracture. The material further acts as a viscous damper serving to reduce vibratory stress. The risers further are shaped to a parabolic cross section for increasing the section modulus and thereby providing additional strength to furnish resistance to bending moments. In order to effect substantial reduction in manufacturing costs and to supply rigidity to the riser construction, a braided hollow rope impregnated with a thermosetting resinous material is placed against the risers in a plane concentric with the commutator and secured thereto by small lengths of material similarly treated. The rope is spaced at various distances outwardly from the commutator and upon curing, forms a construction effective in preventing riser displacement when the machine is operated.

While the specification concludes with claims particularly pointing out and distinctly claiming the subject matter which we regard as our invention, it is believed the invention will be better understood from the following description taken in connection with the accompanying drawing wherein:

FIGURE 1 is a perspective view of a rotor showing the improvements of this invention;

FIGURE 2 is an enlarged perspective view of a commutator including risers attached thereto for illustrating how the compound is arranged between risers; and FIGURE 3 is a view taken on lines 2—2 of FIGURE 1 illustrating the position of the braided rope after it has been secured to the commutator risers.

Referring now to the drawing wherein like reference characters designate like or corresponding parts throughout the several views, there is shown a shaft 8 supporting a commutator comprising segments 10 having risers 12 secured thereto by brazing or a similar process. Each of the risers is fitted into a notch 14 provided in each of the commutator segments and brazed thereto by passing an electric current through the riser and segment after the riser and segment is joined and placed in position. The upper ends of the risers are connected to coils 15 provided on the machine in the usual manner. As illustrated near the bottom of FIGURE 1, each of the risers is of a parabolic cross section throughout its length except for a flat portion 16 provided at the bottom end thereof which is adapted to fit within the slot 14 formed in each of the segments. The outer ends also are flat.

As indicated previously, the risers are apt to fracture at their point of connection to the commutator segments and this undesirable aspect of prior commutator riser construction is overcome in the present invention by locating an initially viscous or putty-like elastomeric material 18 between each of the risers which cures to a relatively hard material wherein the modulus of the material is somewhat less than that of the segments to which it is bonded. The putty, which is resinous and forms a good bond with copper, has the viscosity of heavy grease during application, and is held in place by a backing plate 20 placed flush with the back side of the risers and the segments, while the space between the risers and the side adjacent the commutator is open. After placing the putty in the dam provided, that portion facing the commutator is smoothed off with a knife to provide a smooth surface as illustrated in FIGURE 1.

Since the objective is to prevent fracture of the risers, it has been found necessary to select a putty compound or material possessing a modulus of elasticity, after curing, compatible with that existing in the risers. Preferably, it should be lower, but not so low as to have it correspond with a rubbery material. This requirement is necessary to obtain a gradual transfer of stresses in the risers to the material, rather than have forces represented by stresses drop from a maximum to minimum values. In the prior art constructions, the stresses build up in the risers and reach a maximum value at the point of connection with the commutator segments. Since this is the weakest point in the riser, because of the annealing process, any fracture of the risers probably will occur in this area. The putty material provided by this invention effectively moves the point of maximum stress concentration outwardly on the riser to the outermost point where the putty material is bonded to the risers and where the riser strength has not been affected by annealing. The result obtainable during rotor operation is that the stresses can now dissipate themselves in a more gradual manner by distributing the forces uniformly through the material. This is made possible by selecting a material having the desired modulus of elasticity while possessing other attributes, such as good adhesion to copper and thermal stability in the temperature range of approximately room temperature to 225° F. The modulus should remain essentially constant through this temperature range. It should preferably not change with age and must be resistant to attack by oils and contaminants normally found in areas where electrical machinery is used.

Putty compositions found desirable for this purpose consist of commercially available components prepared by the General Electric Company and identified by the designation: IMS #801-398 A and B. The formulation for this composition is as follows:

Part A: Parts by weight
Epi-Rez 510 (Jones-Dabney) or Araldite 6010 (Ciba Co.) _____ 11.0
Cab-O-Sil (Godfrey L. Cabot) _____ 1.0
                                            ____
                                            12.0

Part B:
Versamid #125 (General Mills, Inc.) _____ 9.0
Cab-O-Sil (Godfrey L. Cabot) _____ 1.0
                                            ____
                                            10.0

Another product equally suitable and designated as IMS #801-449 A and B has the following formulation:

Part A: Parts by weight
Epi-Rez 510 (Jones-Dabney) or Araldite 6010 (Ciba Co.) _____ 11.0
Cab-O-Sil (Godfrey L. Cabot) _____ 1.0
F-1 wollastonite (Godfrey L. Cabot) _____ 5.0
                                            ____
                                            17.0

Part B:
Versamid #125 (General Mills, Inc.) _____ 9.0
Cab-O-Sil (Godfrey L. Cabot) _____ 1.0
F-1 wollastonite (Godfrey L. Cabot) _____ 4.5
                                            ____
                                            14.5

The above compositions are polyamide-epoxy resin blends. The Versamid 125 is the polyamide; the Araldite 6010 and Epi-Rez 510 are the epoxy portion. The Cab-O-Sil (fumed silica) is a flow control agent which enables production of a thixotropic composition which will not flow from a vertical surface. Santocel is a similar material equally satisfactory. The wollastonite (calcium silicate) is a fibrous type filler which adds to the tensile and shear strength of the compound. The compositions which have been used successfully in the risers are noted above. Polyamide-epoxy ratios from 40:60 to 50:50 would serve as well. Other epoxy modifications adapted for use are epoxy-polysulfides, epoxy-isocyanates, epoxy-polybutadiene, epoxy-polyesters, epoxy-glycidyl ethers, epoxy-fatty diamines and epoxy-tung oil adducts. In addition to the epoxy compounds, synthetic elastomers, e.g., polyesters, silicones and polyurethanes may be used.

Deviation from the conventional flat riser of prior construction is provided in this invention by curving the major portion of the risers for increasing the section modulus without changing the mass. A preferred design is illustrated in FIGURES 2 and 3 which show risers of parabolic shape as previously described. These risers are equipped with flat ends to facilitate their assembly in the commutator segments, but the flat areas do not affect the ability of the risers to carry stresses. Obviously, many different designs can be employed for carrying out the stress carrying function while still retaining desirable electrical characteristics. Such different designs consist of square, rectangular or circular shaped bodies; semi-circular, S-shaped and parabolic types also may be used with effectiveness. Since many different variations are possible in light of the teachings herein, all such different designs will be referred to generally as "curved" risers. Obviously, where the configuration is other than flat at the riser bas, an opening of corresponding configuration must be supplied in the commutator segments for proper mounting.

As previously indicated, the risers 12 are subject to fatigue in the circumferential direction when the rotor undergoes reversal operations or operations where torsional or impact stresses are transferred to the risers, such as encountered in the handling of heated billets in steel mills. Efforts in the past have led manufacturers to employ twine, buttons and other means on the risers to prevent fatigue as previously described. This invention eliminates the undesirable features attributed to twine and buttons by placing a hollow braided rope 22 impregnated with a thermosetting resinous material in contact with the risers 12 and at spaced intervals from the commutator 10. The rope is initially soft and pliable and is rigidly fixed in position by a strand or tie cord 24 similarly treated, which as shown in FIGURES 2 and 3, is looped around the rope and each riser and drawn up tightly to force a portion 26 of the rope between adjacent risers. The tie cord is then cinched or knotted at 28 before proceeeding to the next riser where the lashing process is repeated. Upon curing of the resin, the rope and tie cord not only bonds tightly to the copper risers but also forms a hard rigid substance comparable in strength to steel and therefore is not capable of deforming when subjected to the stress forces created in the risers during machine operation. Portion 26 of the rope is particularly effective in preventing riser deflection and vibration since it acts to lock each riser in a set, fixed position.

The strands comprising rope 22 may be made from natural fibers, such as cotton, or from synthetic products, as Dacron or nylon. Glass fiber is especially adaptable for use because of its inertness and inherent ability to withstand heat. Impregnating material may consist of phenolic, polyester or ethoxylin resins which are thermosetting.

As previously indicated, the braided rope is constructed such that it is compressible perpendicular to the axis of the rope. This is accomplished by a loose braid which leaves the center of the cord essentially hollow. Where greater tensile strength in the circumferential direction is needed, the braid is applied loosely about similar treated roving laid parallel with the axis of the rope. This compressibility has the effect of producing teeth or notches in the surface of the soft rope when it is pulled tautly into contact with the leads by the individual lashing cords. When the resin is converted, these rigid notches provide support to the leads and prevent individual movement in a circumferential direction.

It is also desirable to provide rigid bracing to the risers adjacent the area where attachment is made to the commutator segments. In the preferred embodiment, a continuous strand 30 comprising fibers treated with a resinous material, both as described above, are looped around and cinched to each riser prior to proceeding to the next adjacent one. Preferably, the strand 30 is lashed to the risers at a point near the outer surface of the compound 18 so that its major portion is enclosed by the material. Obviously, the strand may be located inwardly or outwardly from this point, as shown in FIGURE 2, for example.

The objective of this invention is to minimize fracture of commutator risers at their point of connection to commutator segments. Particular materials have been disclosed which represent those found to be successful in meeting this objective. Obviously, other materials located at different points in the riser construction may serve as well and are intended to fall within the scope of this disclosure. Many modifications are therefore possible in light of the above teachings, and it is to be understood that within the terms of the claims, the invention may be practiced otherwise than as specifically described.

What we claim as new and desire to secure by Letters Patent of the United States is:

1. A rotor for a dynamoelectric machine comprising a shaft supporting a commutator and a core having coils disposed in its peripheral surface, risers respectively interconnecting said coils with segments comprising the commutator, and a putty of initially soft composition positioned therebetween and bonded to the risers and cured to a hard substance having a modulus of elasticity less than the risers for absorbing stresses in the risers and making a gradual transition therein from great stress to low stress when said rotor is operating.

2. A rotor for a dynamoelectric machine comprising a shaft supporting a commutator and a core having coils disposed in its peripheral surface, risers respectively interconnecting said coils with segments comprising the commutator, an elastomeric material having a modulus of elasticity less than said risers and positioned therebetween and extending a distance outwardly of the risers sufficient to avoid an annealed area therein resulting from brazing the risers to the commutator segments, and an initially flexible material which cures to a rigid body having strength equivalent to steel attached to said risers between the segments and coils for preventing displacement of the risers during operation of the rotor.

3. A rotor for a dynamoelectric machine comprising a shaft supporting a commutator and a core having coils disposed in its peripheral surface, risers respectively interconnecting said coils with segments comprising the commutator, a body of initially viscous resinous material positioned between said risers and extending outwardly from the commutator segments a distance greater than an annealed area in the risers resulting from brazing the latter to the segments, said resinous material being of a type curable into a substantially solid mass having a modulus of elasticity less than that of said risers for absorbing stresses created therein during operation of the rotor.

4. A rotor for a dynamoelectric machine comprising a shaft supporting a commutator and a core having coils disposed in its peripheral surface, risers respectively interconnecting said coils with segments comprising the commutator, an elastomeric material having a modulus of elasticity less than said risers positioned therebetween and extending a sufficient distance outwardly from the commutator segments to permit a gradual decline in stresses created in the risers from a maximum to minimum value, and an initially pliable hollow rope impregnated with a thermosetting resinous material tied to said risers and in a plane concentric with the commutator, said rope having portions thereof drawn inwardly between adjacent risers when installed so that upon curing of the resin, a hard rigid structure is provided effective in minimizing displacement of the risers during rotor operation.

5. The combination according to claim 4 wherein said risers are shaped to a curved configuration throughout a major portion of their length.

6. The combination according to claim 4 wherein the cross-sectional area of said risers is shaped to the configuration of a parabola throughout their length, and a flat portion integrally formed therewith to permit attachment of the risers to the commutator segments.

7. A rotor for a dynamoelectric machine comprising a shaft supporting a commutator and a core having coils disposed in its peripheral surface, curved risers equipped with flat ends on opposite ends thereof and of a distance just sufficient to permit attachment to their respective coils and commutator segments, an elastomeric compound firmly bonded to said risers and extending outwardly from said segments a distance sufficient to engage a curved portion on the risers and past an annealed area existing adjacent the point of riser attachment to the segments, said compound having a modulus of elasticity less than said risers.

8. The combination according to claim 7 wherein said risers are bound together beneath said compound by a cord treated with a resinous material capable of being cured to a rigid substance.

9. A rotor for a dynamoelectric machine comprising a shaft supporting a commutator and a core having coils disposed in its peripheral surface, risers respectively interconnecting said coils with segments comprising the commutator, and an initially pliable hollow rope impregnated with a thermosetting resinous compound placed in contact with said risers, a portion of said hollow rope drawn into and positioned between adjacent risers and attached thereto by securing means, so that when the resin cures, a hard rigid structure is provided effective in minimizing displacement of the risers during rotor operation.

References Cited in the file of this patent

UNITED STATES PATENTS

| 903,881 | Peck | Nov. 17, 1908 |
| 932,042 | Mattman | Aug. 24, 1909 |
| 1,005,874 | Ralston | Oct. 17, 1911 |
| 2,470,647 | Roberts | May 17, 1949 |
| 2,747,118 | Coggeshall | May 22, 1956 |
| 2,829,289 | Ottewell | Apr. 1, 1958 |

OTHER REFERENCES

Plastics Engineering Handbook by Society of Plastic Industries, Inc., Reinhold Pub. Co., 1954, New York, N.Y.